(12) United States Patent
Brown

(10) Patent No.: US 12,042,878 B2
(45) Date of Patent: Jul. 23, 2024

(54) ULTRASONIC SONOTRODE WITH WORKPIECE CLAMPING TOOL

(71) Applicant: T.A. Systems, Inc., Rochester Hills, MI (US)

(72) Inventor: Theodore Robert Brown, Birmingham, MI (US)

(73) Assignee: T.A. SYSTEMS, INC., Rochester Hills, MI (US)

( * ) Notice: Subject to any disclaimer, the term of this patent is extended or adjusted under 35 U.S.C. 154(b) by 454 days.

(21) Appl. No.: 17/420,272

(22) PCT Filed: Feb. 7, 2020

(86) PCT No.: PCT/US2020/017180
§ 371 (c)(1),
(2) Date: Jul. 1, 2021

(87) PCT Pub. No.: WO2020/163694
PCT Pub. Date: Aug. 13, 2020

(65) Prior Publication Data
US 2022/0088701 A1    Mar. 24, 2022

Related U.S. Application Data

(60) Provisional application No. 62/802,501, filed on Feb. 7, 2019.

(51) Int. Cl.
*B23K 20/00*        (2006.01)
*B23K 20/10*        (2006.01)
(Continued)

(52) U.S. Cl.
CPC ............ *B23K 20/106* (2013.01); *B29C 65/08* (2013.01); *B29C 66/8161* (2013.01)

(58) Field of Classification Search
CPC .............................. B23K 20/10; B23K 20/106
See application file for complete search history.

(56) References Cited

U.S. PATENT DOCUMENTS 3,607,580 A * 9/1971 Obeda ................. B29C 66/8322
228/1.1
4,842,671 A * 6/1989 Nuss ................... B29C 66/9672
156/73.2
(Continued)

FOREIGN PATENT DOCUMENTS

JP        S61121928 A      6/1986

OTHER PUBLICATIONS

International Preliminary Report on Patentability for International Application No. PCT/US2020/017180 mailed Aug. 19, 2021.
(Continued)

*Primary Examiner* — Erin B Saad
(74) *Attorney, Agent, or Firm* — Carlson, Gaskey & Olds, P.C.

(57) ABSTRACT

An ultrasonic welder includes, among other things, a sonotrode, a sleeve that is arranged at least partially around the sonotrode, and a biasing assembly that acts on the sleeve and is configured to urge the sleeve to an extended position relative to the sonotrode in response to a biasing force. The sleeve is configured to move from the extended position to a clamping position relative to the sonotrode in response to engagement with a workpiece which opposes the biasing force.

13 Claims, 7 Drawing Sheets

(51) Int. Cl.
  *B29C 65/00*    (2006.01)
  *B29C 65/08*    (2006.01)

(56)         References Cited

U.S. PATENT DOCUMENTS

| | | | |
|---|---|---|---|
| 6,578,753 B1* | 6/2003 | Sakakura | B23K 20/106 |
| | | | 228/180.5 |
| 9,248,520 B2* | 2/2016 | Lang | B23K 20/106 |
| 9,751,257 B2* | 9/2017 | Li | B29C 65/08 |
| 10,525,634 B2* | 1/2020 | Vila Noria | B29C 66/0342 |
| 11,504,800 B2* | 11/2022 | Copperthite | B23K 20/106 |
| 2018/0021884 A1* | 1/2018 | Brunner | B23K 20/106 |
| | | | 228/110.1 |
| 2019/0275748 A1* | 9/2019 | Vila Noria | B29C 66/8161 |
| 2021/0114309 A1* | 4/2021 | Beach | B29C 66/8145 |
| 2022/0088700 A1* | 3/2022 | Mancini | B23K 20/106 |
| 2022/0088701 A1* | 3/2022 | Brown | B29C 66/8161 |
| 2022/0226942 A1* | 7/2022 | Stoltz | B23K 37/04 |

OTHER PUBLICATIONS

International Search Report and Written Opinion for International Application No. PCT/US2020/017180 mailed May 26, 2020.

* cited by examiner

ULTRASONIC SONOTRODE WITH WORKPIECE CLAMPING TOOL

CROSS-REFERENCE TO RELATED APPLICATIONS

This application claims priority to U.S. Provisional Application No. 62/802,501 which was filed on Feb. 7, 2019, and is incorporated herein by reference.

BACKGROUND

This disclosure relates to a clamping tool for use in connection with an ultrasonic sonotrode of an ultrasonic welding machine.

In a typical ultrasonic welding application, a fixture supports a workpiece to be welded, which may comprise multiple plastic components. An ultrasonic welder typically includes a converter having a piezoelectric stack that selectively vibrates in response to power from a generator. A booster optionally may be used at a working end of the converter to modify the amplitude of the vibrational frequency supplied by the converter. A sonotrode is mounted to the booster opposite the converter and is used to impart vibration to the workpiece.

During a welding operation, the sonotrode is advanced by a pneumatic cylinder or other mechanic device to engage the workpiece. The pneumatic cylinder maintains a desired force on the workpiece via the sonotrode. A controller energizes the generator for a time sufficient to weld the components to one another. The sonotrode is retracted once the weld is complete.

A typical workpiece includes multiple plastic parts that are secured to one another using a variety of fastener configurations. To achieve a quality weld, the parts of the workpiece have to be clamped tightly together for the ultrasonic energy from the sonotrode to be transferred from the upper part to the lower part, or substrate. Failure to provide sufficient clamping load can result in poor quality welds, read through (A-surface marring), poor pull strength and/or squeaky parts when in use.

Typical clamping configurations use an elaborate clamp plate mechanism, or hold down probes, that is specific to each workpiece design. Hold down locations for localized clamping need to be very close to the weld points due to part warpage, commonly, a clamp for every two weld points on the workpiece. These clamp plate mechanisms are expensive, and restrict access to the part, and due to the proximity of the sonotrode mechanism, are located at an unacceptable distance from the optimal point of clamping the two plastic parts, thus complicating the design of the ultrasonic welding machine and quality of the weld.

SUMMARY

In one exemplary embodiment, an ultrasonic welder includes, among other things, a sonotrode, a sleeve that is arranged at least partially around the sonotrode, and a biasing assembly that acts on the sleeve and is configured to urge the sleeve to an extended position relative to the sonotrode in response to a biasing force. The sleeve is configured to move from the extended position to a clamping position relative to the sonotrode in response to engagement with a workpiece which opposes the biasing force.

In a further embodiment of any of the above, the sonotrode includes a first terminal end. The sleeve has a second terminal end. The second terminal end extends beyond the first terminal end a first distance in the extended position. The second terminal end is positioned relative to the first terminal end a second distance that is less than the first distance when in the clamping position.

In a further embodiment of any of the above, the sonotrode extends from a base to a terminal end in a longitudinal direction. The sleeve is movable between the extended position and the clamping position in the longitudinal direction.

In a further embodiment of any of the above, the biasing assembly includes a spring that is operatively arranged between the sonotrode and the sleeve. The spring is configured to urge the sleeve to the extended position. The spring is compressed in the clamping position relative to the extended position.

In a further embodiment of any of the above, the ultrasonic welder includes an ultrasonic converter to which the sonotrode is mounted. The biasing assembly includes a collar that is secured relative to the converter. The collar provides a stop that defines the extended position. The spring is arranged in the collar.

In a further embodiment of any of the above, the stop is provided by a second flange of the collar that is received in a groove in the sleeve. A first flange of the sleeve abuts the second flange in the extended position. The first and second flanges are spaced apart from one another in the clamping position.

In a further embodiment of any of the above, the collar includes first and second portions that are secured to one another by an attachment feature. The sleeve is arranged radially between the first and second portions.

In a further embodiment of any of the above, a cavity is provided within the sleeve. A spacer is provided between the sleeve and the sonotrode to provide a gap. The cavity and gap is in fluid communication with a first terminal end of the sonotrode.

In a further embodiment of any of the above, the ultrasonic welder includes an air source that is in fluid communication with the cavity via a cooling line.

In a further embodiment of any of the above, a second terminal end of the sleeve includes multiple notches that are provided in a periphery of the second terminal end.

In a further embodiment of any of the above, the spacer is provided on an interior surface of the sleeve. The spacer is provided by multiple protrusions that engage at least one of a base and a shaft of the sonotrode.

In another exemplary embodiment, a clamping tool for use with an ultrasonic welder sonotrode, the clamping tool includes a collar, a sleeve, and a spring that is arranged in the collar and configured to urge the sleeve to an extended position. The collar proves a stop that defines the extended position. The sleeve is movable to a clamping position in which the biasing assembly is compressed.

In a further embodiment of any of the above, the stop is provided by a second flange of the collar that is received in a groove in the sleeve. A first flange of the sleeve abuts the second flange in the extended position. The first and second flanges are spaced apart from one another in the clamping position.

In a further embodiment of any of the above, the collar includes first and second portions that are secured to one another by an attachment feature. The sleeve is arranged radially between the first and second portions.

In a further embodiment of any of the above, one of the collar and the sleeve includes a hole with an air fitting.

In another exemplary embodiment, a method of ultrasonically welding a workpiece includes the steps of advancing a sonotrode toward a workpiece, engaging the workpiece with a tool that is carried along with the sonotrode, generating a clamping load on the workpiece with the tool in a clamping position, and ultrasonically welding the workpiece under the clamping load.

In a further embodiment of any of the above, the method further includes the step of retracting the sonotrode subsequent to performing the ultrasonic welding step. The method also includes unloading the tool from the clamping position to an extended position in response to the retracting step.

In a further embodiment of any of the above, the tool comprises a sleeve that is arranged at least partially about the sonotrode. The tool moves longitudinally along the sonotrode between the clamping and extended positions.

In a further embodiment of any of the above, the pushing step includes compressing a spring with the tool. The spring produces the clamping load.

In a further embodiment of any of the above, the method further includes the step of supplying a cooling air to the tool. The cooling air cools the sonotrode during the ultrasonic welding step.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
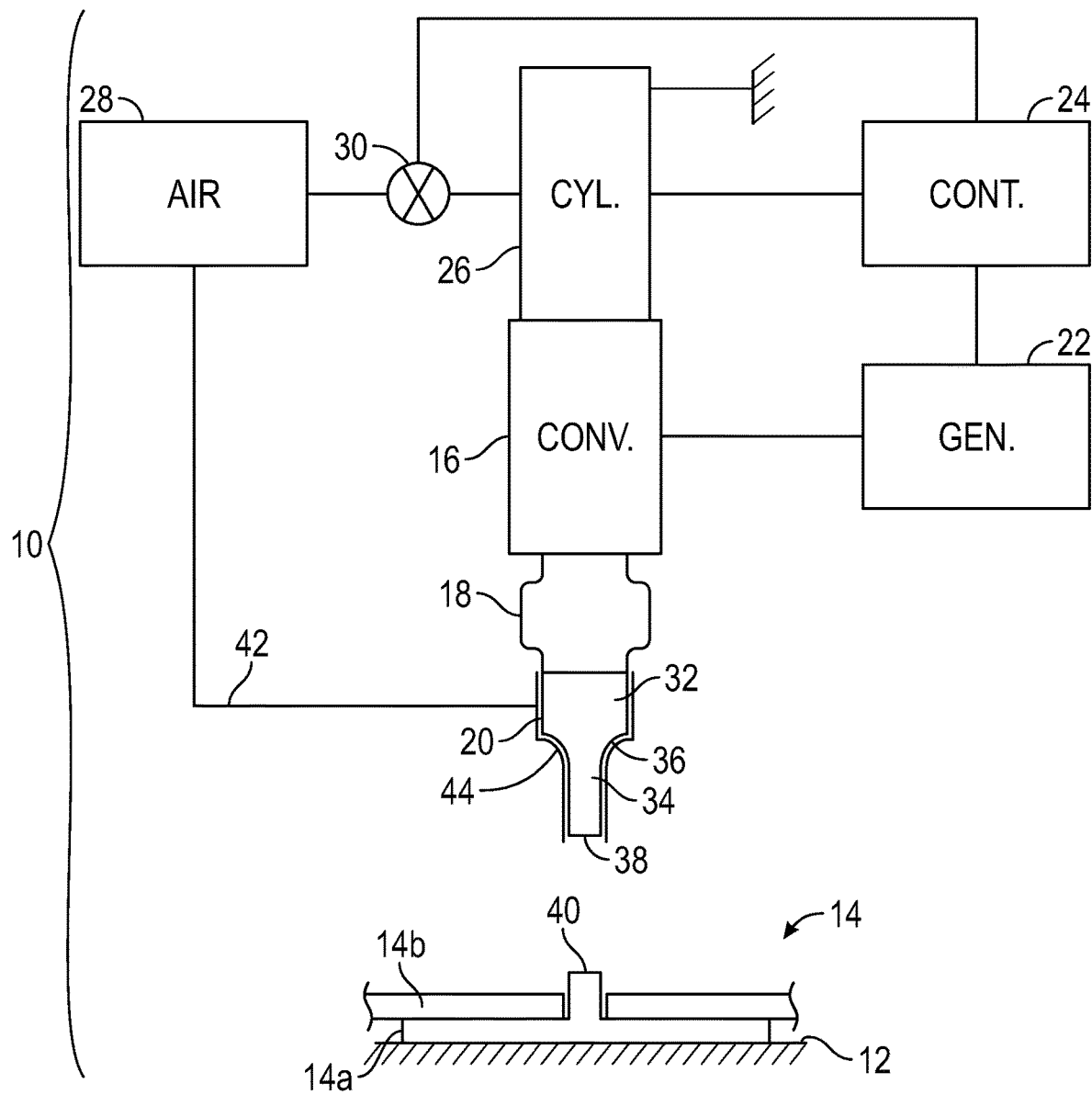
FIG. 1 schematically illustrates a common ultrasonic welder.

An example ultrasonic welder 10 is shown in FIG. 1. The welder 10 is typically used to join multiple parts 14a, 14b of a workpiece 14 that is supported in a fixture 12. In one example, the workpiece 14 includes plastic automotive components. It should be understood that the ultrasonic welder 10 can be used in other applications, such as packaging and food processing, for example. The disclosed sonotrode can be used with other materials.

A sonotrode 20 selectively engages the workpiece 14 to impart a vibration on the workpiece 14 sufficient to generate heat and melt the parts to one another. To this end, the sonotrode 20 is operatively secured to an ultrasonic converter 16, which includes piezoelectric or other elements that vibrate (e.g., at up to 50 kHz) in response to a signal from a generator 22 that is commanded by a controller 24. The sonotrode 20 may be designed to be used at other frequencies, if desired. A booster 18 may be mounted between the converter 16 and the sonotrode 20 to tune the frequency provided by the converter 16 to the sonotrode 20. The sonotrode 20 has a shaft 34 that extends from a base 32 in a longitudinal direction L (FIGS. 4A and 4B) to a first terminal end 38, which is designed to engage the workpiece and provide a desired profile to the melted material. A fillet 36 provides a transition between the base 32 and shaft 34.

During operation, a motion device, advances the sonotrode 20 to engage the surface 40 of the workpiece 14 with the first terminal end 38 and maintain a contact pressure during the welding process. The motion device, for example, a pneumatic cylinder 26, may be regulated by a valve 30 that selectively controls the flow of compressed air from an air source 28 to the cylinder 26 in response to a command from the controller 24. The welder 10 can be configured in a different manner than described, for example, the motion device may be provided by a servo motor and/or robot.

Figure 2:
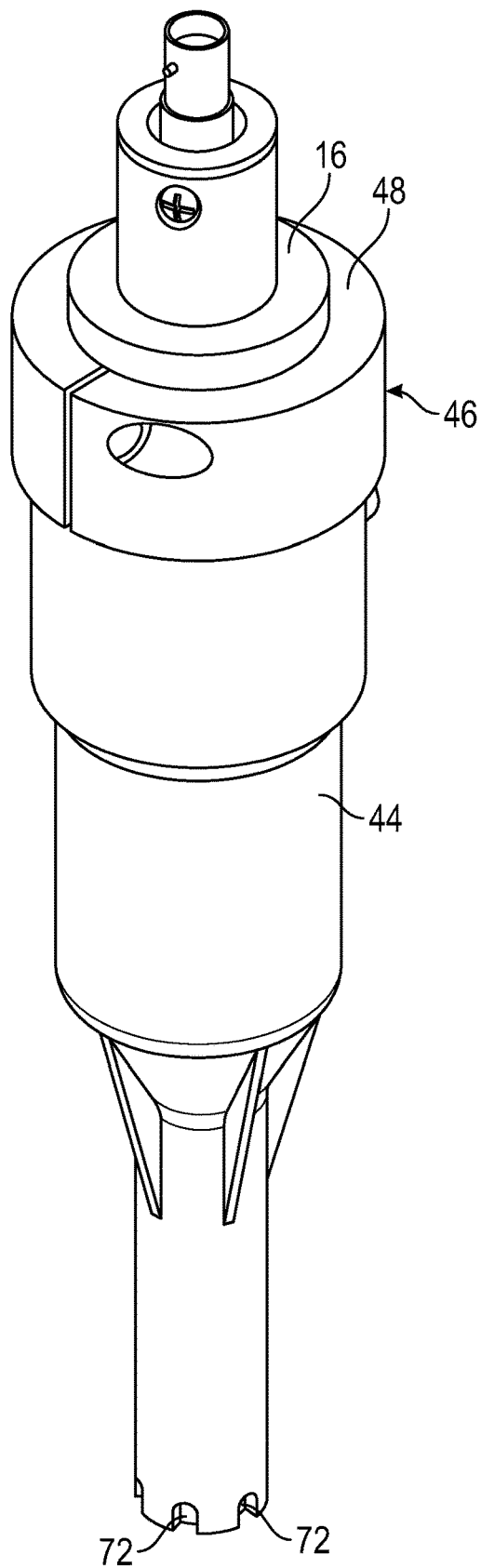
FIG. 2 illustrates a perspective view of an ultrasonic converter supporting a sleeve arranged over a sonotrode.

Referring to FIG. 2, a clamping tool, which may be provided in part by a sleeve 44, is arranged at least partially about the sonotrode 20. A biasing assembly 46 acts on the sleeve 44 and is configured to urge the sleeve 44 to an extended position (FIG. 4A) relative to the sonotrode 20. The sleeve 44 is movable from the extended position to a clamping position (FIG. 4B) relative to the sonotrode 20 and in which one or more elements in the biasing assembly 46 are compressed to provide a clamping load on the workpiece 14.

In one example, the biasing assembly 46 includes a collar 48 that is clamped to the ultrasonic converter 16. This type of configuration enables the workpiece clamping feature provided by the sleeve 44 to be easily retrofitted onto existing ultrasonic welding equipment. However, it should be understood that the sleeve 44 may be supported with respect to the sonotrode 20 using other configurations.

Figure 3:
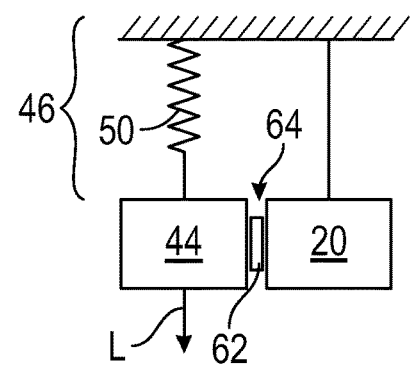
FIG. 3 is a schematic view of the sleeve movable with respect to the sonotrode using a biasing assembly.
Figure 5B:
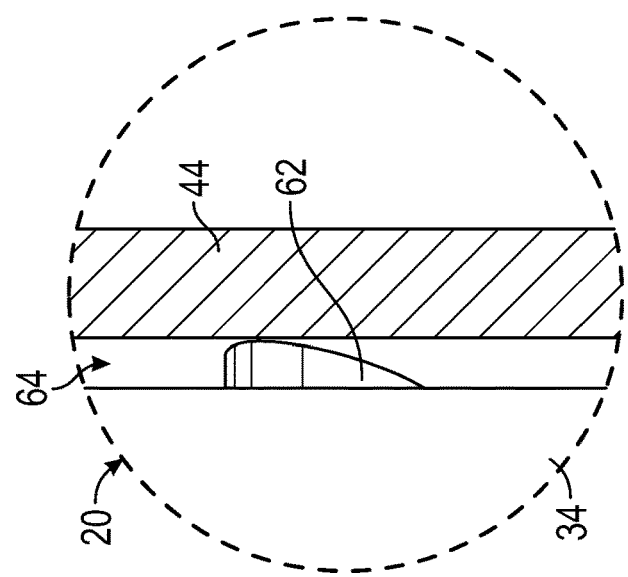
FIGS. 5A and 5B respectively illustrate first and second spacers provided between the sonotrode and sleeve.
Figure 5A:
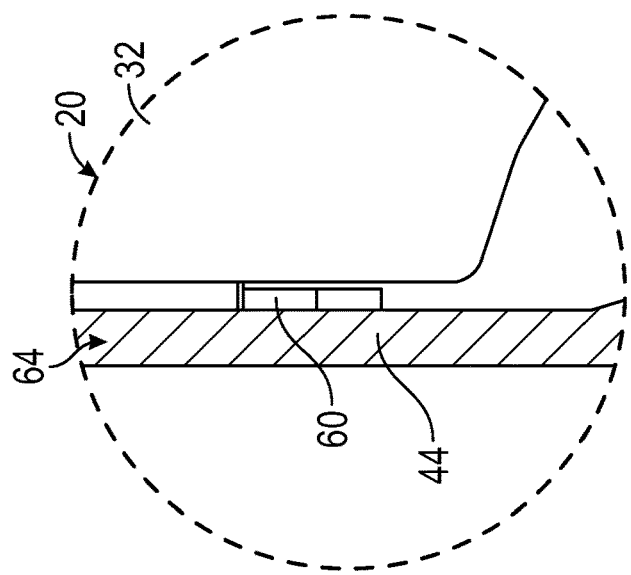

Referring to FIG. 3, a spring 50 is used to longitudinally urge the sleeve 44 along the longitudinal direction L from the compressed position to the extended position. In one example, a spacer 62 (and/or spacer 60, FIGS. 5A and 6) is provided between the sonotrode 20 and the sleeve 44 to reduce friction and provide a gap 64 through which air may be supplied to cool the tip of the sonotrode and the workpiece during welding operations. The spacer 62 may be provided by one or more elements, and the spacer 62 can be provided at the sonotrode 20 and/or at the sleeve 44 in any desired location.

Figure 4A:
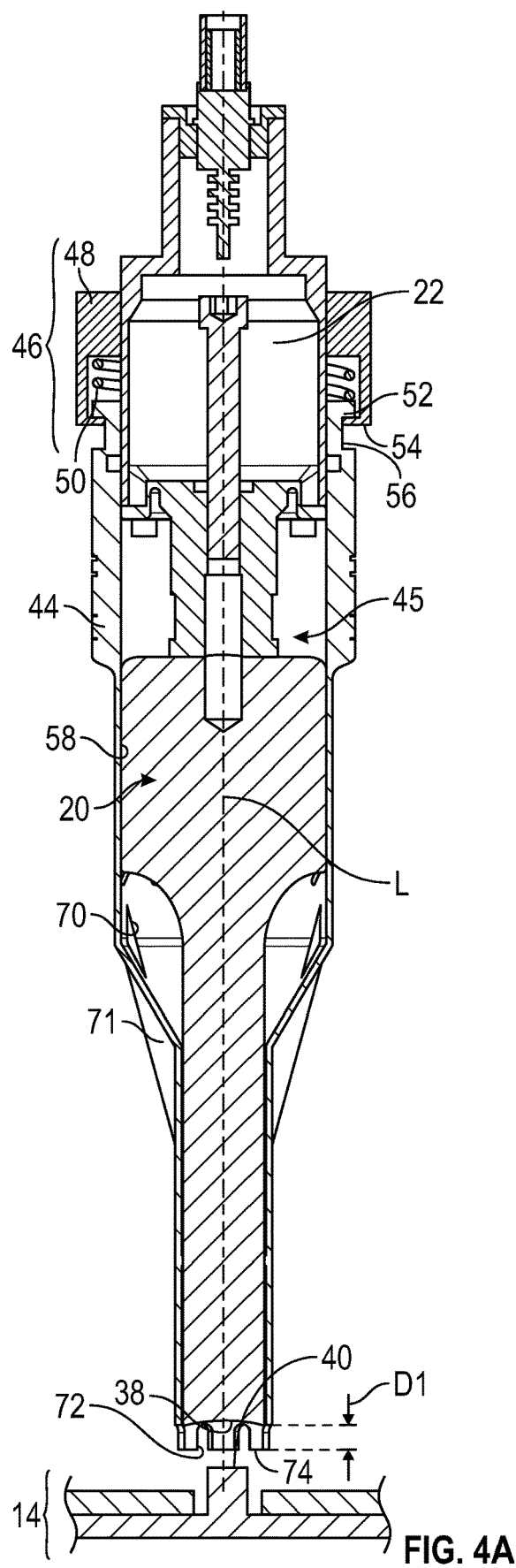
FIGS. 4A and 4B are cross-sectional views of the assembly illustrated in FIG. 2 respectively depicting the sleeve in extended and clamping positions.
Figure 4B:
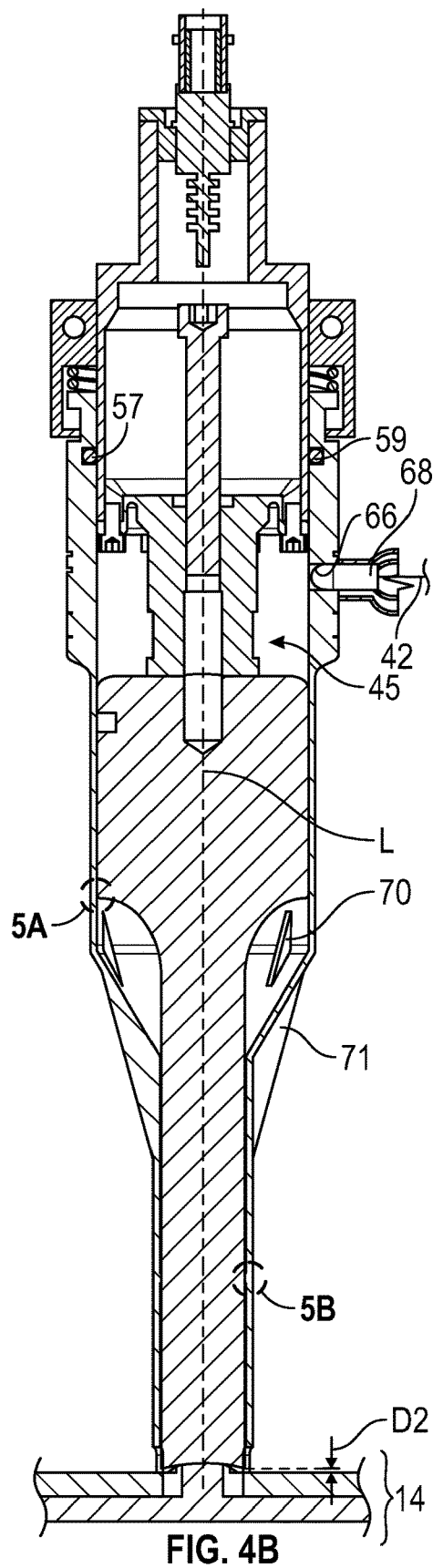

Referring to FIGS. 4A and 4B, a cavity 45 is provided within the sleeve 44. A hole 66 is provided in the sleeve 44 and receives a fitting 68 connected to a cooling line 42 that delivers air from the air source 28 to the cavity 45. The sleeve 44 includes an annular groove 57 that receives a seal 59, which prevents air from escaping the cavity 45, as well as centers the sleeve assembly around the overall assembly centerline.

Figure 6:
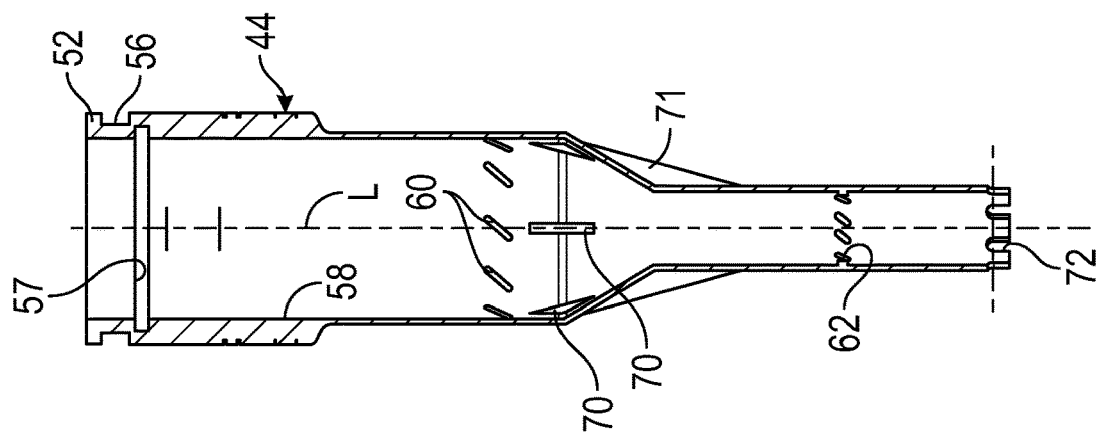
FIG. 6 depicts the sleeve in cross-section.

The gap 64 (FIGS. 5A and 5B) fluidly connects the cavity 45 to the first terminal end 38 of the sonotrode 20. First and second sets of spacers 60, 62 maintain the gap 64 during operation. As shown in FIG. 6, the first and second sets of circumferentially spaced apart spacers 60, 62 extend from an interior surface 58 of the sleeve 44 interiorly into the cavity 45. The spacers 60, 62 are arranged at an acute angle relative to the longitudinal direction L to encourage a spiral airflow through the gap 64 and increase convective cooling.

With continuing reference to FIG. 6, internal and external ribs 70, 71 are used to reinforce the sleeve 44 in the area of the transition from the large diameter portion arranged about the base 32 and the small diameter portion arranged about shaft 34.

Returning to FIGS. 4A and 4B, the sleeve 44 includes a first flange 52 and an annular groove 56. The spring 50 is arranged within the collar 48 at the first flange 52. A second flange 54 of the collar 48 is received in an annular recess 56 and provides a stop, limiting travel of the sleeve 44 along the longitudinal direction L of the sonotrode 20 to the extended position, shown in FIG. 4A. In this extended position, the first terminal end and a second terminal end 74 of the sleeve are spaced apart a first distance D1.

The clamping position is illustrated in FIG. 4B with the sleeve 44 engaging the upper part 14a and clamping the workpiece 14 as the sonotrode 20 melts the surface 40. In the clamping position, the first and second terminal ends 38, 74 are arranged apart a second distance D2, which is less than the first distance D1, as the advance movement of the sonotrode 20 collapses the spring. The second distance D2 may be 0 or a negative distance relative to D1.

In operation, the workpiece 14 is ultrasonically welded by advancing the sonotrode 20 toward the workpiece 14. The workpiece 14 is engaged with the clamping tool, i.e., the sleeve 44, carried by and movable longitudinally relative to the sonotrode 20, in one example embodiment.

As the sonotrode 20 advances, the second terminal end 74 of the sleeve 44 makes contact with the upper part 14a of the workpiece 14. Continued advancement of the sonotrode 20 pushes the sleeve 44 and compresses the spring 50, which generates a clamping load on the workpiece 14. The workpiece 14 is then ultrasonically welded under the clamping load. As the workpiece 14 melts during the welding process, the cylinder 26 continues to advance the sonotrode 20 toward the workpiece 14, and the sleeve 44 increases the clamping load in clamping position (FIG. 4B) as the spring 50 is compressed further.

During the welding operation, cooling air is provided via the cooling line 42 to the cavity 45 where it is supplied through the gap 64 toward the first terminal end 38 of the sonotrode 20. The cooling air is permitted to exhaust out the notches 72 in the second terminal end 74. The sonotrode 20 is retracted subsequent to completing the weld, which unloads the sleeve 44 permitting the sleeve 44 to move longitudinally from the clamping position (FIG. 4B) back to the extended position (FIG. 4A).

Figure 7:
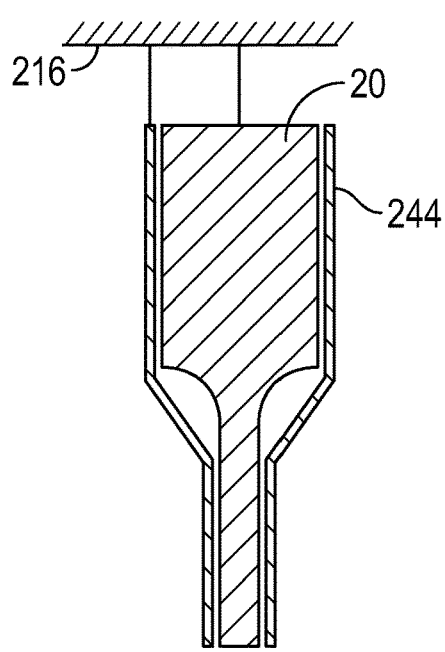
FIG. 7 illustrates an embodiment with the sonotrode and the sleeve fixed relative to one another.

In another example embodiment shown in FIG. 7, the sonotrode 20 and the sleeve 244 may be fixed relative to one another, for example, supported by the generator 216. In such an arrangement, the ends of the sleeve 244 and sonotrode 20 remain generally stationary with respect to one another. This type of arrangement may be suitable in applications where no movement or warpage between parts is expected.

Figure 8:
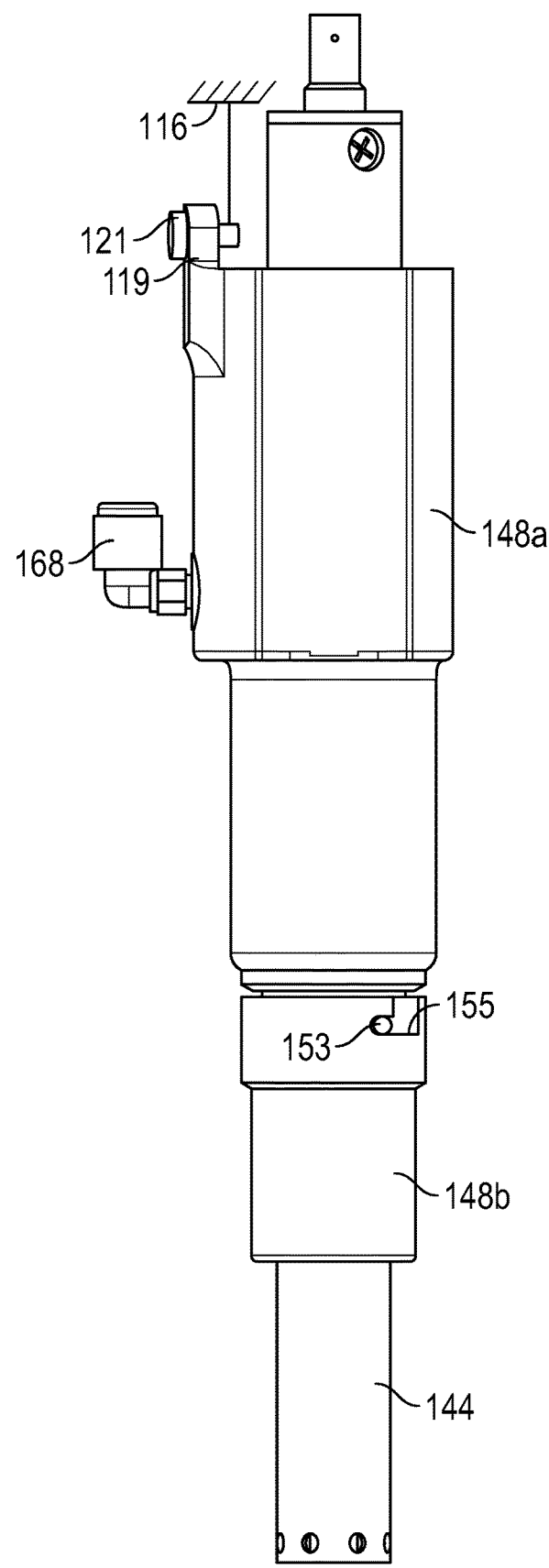
FIG. 8 is another sleeve and biasing assembly configuration.
Figure 9:
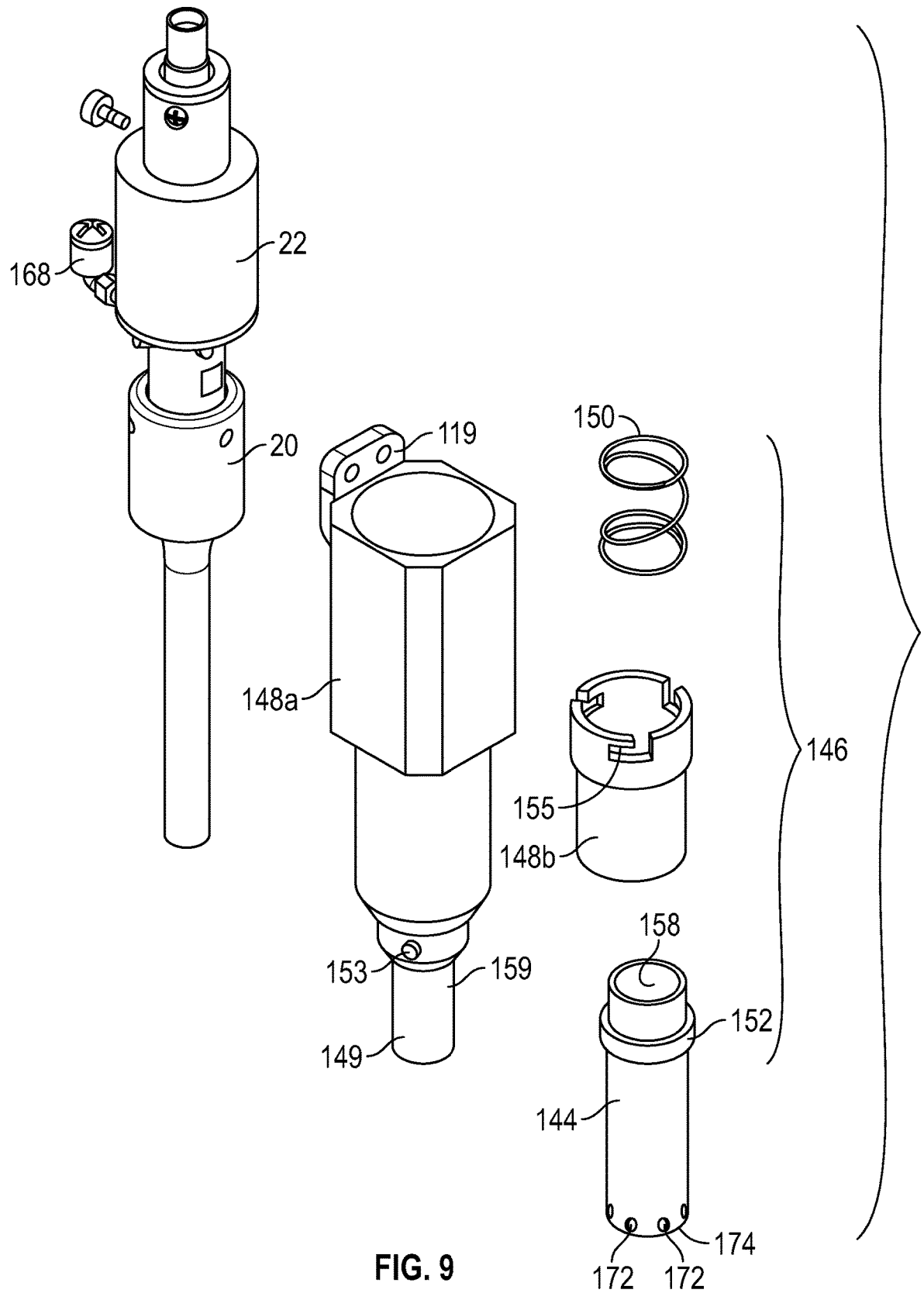
FIG. 9 is an exploded view of the configuration illustrated in FIG. 8.
Figure 10:
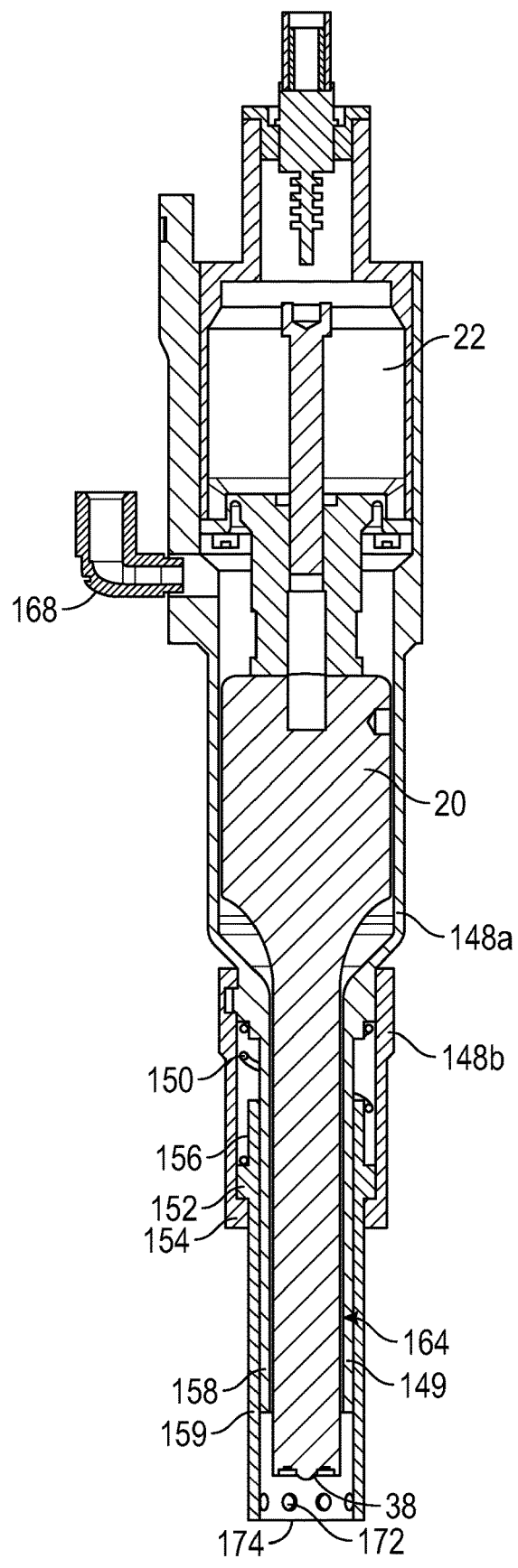
FIG. 10 is a cross-sectional view of the configuration depicted in FIG. 8.

Another embodiment is shown in FIGS. 8-10. A two-piece collar having first and second portions 148a, 148b is shown. The first portion 148a is affixed relative to structure, such as the converter 116, using a flange 119 and fasteners 121. A fluid fitting 168 is mounted to the first portion 148a to supply cooling fluid from the air source.

The second portion 148b is secured to the first portion 148a using a quick connect attachment feature comprising radially extending pins 153 that selectively cooperate with locking apertures 155 provided on the second portion 148b. This enables the sleeve 144, which is radially captured between the first and second portions 148a, 148b, to be quickly and easily replaced and/or serviced.

As best shown in FIGS. 9 and 10, the first portion 148a has a neck 149 against which the sleeve 148 slides. In the example, an inner diameter 158 of the sleeve 144 slides along an outer diameter 159 of the first portion 148a between the extended and clamping positions.

The biasing assembly 146 includes a spring 150 abutting a shoulder provided by the first portion 148a. The spring 150 extends to a first flange 152, which is captured by a second flange 154 on the second portion 148b, which acts as a stop defining the extended position.

Sufficient clearance is provided between the sonotrode 20 and the inner diameter of the first portion 148a to permit the flow of cooling air. Spacers may be used at the inner diameter of the neck 149, if desired, to enable fluid to flow through the gap 164. Holes 172 are arranged near the terminal end 174 of the sleeve 144 to permit the cooling fluid to exit the sleeve 144 when engaging the workpiece.

Integrating the clamping sleeve into the existing ultrasonic welding equipment, without using a separate clamp plate mechanism reduces the cost of the ultrasonic welding machine. Since the clamp is provided locally at each weld, a better weld is provided. Additionally, cooling is integrated into the sonotrode/clamping sleeve arrangement, which introduces further efficiencies to the welding process.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An ultrasonic welder comprising:
a sonotrode;
an ultrasonic converter to which the sonotrode is mounted;
a sleeve arranged at least partially around the sonotrode; and
a biasing assembly acting on the sleeve and configured to urge the sleeve to an extended position relative to the sonotrode in response to a biasing force, the sleeve configured to move from the extended position to a clamping position relative to the sonotrode in response to engagement with a workpiece which opposes the biasing force, wherein the biasing assembly includes a collar secured relative to the converter, the collar providing a stop defining the extended position, and a spring arranged in the collar and configured to urge the sleeve to an extended position, the collar includes first and second portions secured to one another by a quick connect attachment feature, the sleeve arranged radially between the first and second portions.

2. An ultrasonic welder comprising:
a sonotrode;
an ultrasonic converter to which the sonotrode is mounted;
a sleeve arranged at least partially around the sonotrode; and
a biasing assembly acting on the sleeve and configured to urge the sleeve to an extended position relative to the sonotrode in response to a biasing force, the sleeve configured to move from the extended position to a clamping position relative to the sonotrode in response to engagement with a workpiece which opposes the biasing force, wherein the biasing assembly includes a collar secured relative to the converter, the collar providing a stop defining the extended position, and a spring arranged in the collar and configured to urge the sleeve to an extended position, the collar includes first and second portions secured to one another by an attachment feature, the sleeve arranged radially between the first and second portions, wherein the sonotrode includes a first terminal end, and the sleeve has a second terminal end, the second terminal end extends beyond the first terminal end a first distance in the extended position, and the second terminal end is positioned relative to the first terminal end a second distance that is less than the first distance when in the clamping position.

3. The ultrasonic welder of claim 1, wherein the sonotrode extends from a base to a terminal end in a longitudinal direction, and the sleeve is movable between the extended position and the clamping position in the longitudinal direction.

4. An ultrasonic welder comprising:
a sonotrode;
an ultrasonic converter to which the sonotrode is mounted;
a sleeve arranged at least partially around the sonotrode; and
a biasing assembly acting on the sleeve and configured to urge the sleeve to an extended position relative to the sonotrode in response to a biasing force, the sleeve configured to move from the extended position to a clamping position relative to the sonotrode in response to engagement with a workpiece which opposes the biasing force, wherein the biasing assembly includes a collar secured relative to the converter, the collar providing a stop defining the extended position, and a spring arranged in the collar and configured to urge the sleeve to an extended position, the collar includes first and second portions secured to one another by an attachment feature, the sleeve arranged radially between the first and second portions, wherein the biasing assembly includes a spring operatively arranged between the sonotrode and the sleeve, the spring is configured to urge the sleeve to the extended position, and the spring is compressed in the clamping position relative to the extended position.

5. An ultrasonic welder comprising:
a sonotrode;
an ultrasonic converter to which the sonotrode is mounted;
a sleeve arranged at least partially around the sonotrode; and
a biasing assembly acting on the sleeve and configured to urge the sleeve to an extended position relative to the sonotrode in response to a biasing force, the sleeve configured to move from the extended position to a clamping position relative to the sonotrode in response to engagement with a workpiece which opposes the biasing force, wherein the biasing assembly includes a collar secured relative to the converter, the collar providing a stop defining the extended position, and a spring arranged in the collar and configured to urge the sleeve to an extended position, the collar includes first and second portions secured to one another by an attachment feature, the sleeve arranged radially between the first and second portions, wherein the stop is provided by a second flange of the collar received in a groove in the sleeve, and a first flange of the sleeve abuts the second flange in the extended position, the first and second flanges spaced apart from one another in the clamping position.

6. The ultrasonic welder of claim 5, wherein the collar includes first and second portions secured to one another by an attachment feature, the sleeve arranged radially between the first and second portions.

7. An ultrasonic welder comprising:
a sonotrode;
an ultrasonic converter to which the sonotrode is mounted;
a sleeve arranged at least partially around the sonotrode; and
a biasing assembly acting on the sleeve and configured to urge the sleeve to an extended position relative to the sonotrode in response to a biasing force, the sleeve configured to move from the extended position to a clamping position relative to the sonotrode in response to engagement with a workpiece which opposes the biasing force, wherein the biasing assembly includes a collar secured relative to the converter, the collar providing a stop defining the extended position, and a spring arranged in the collar and configured to urge the sleeve to an extended position, the collar includes first and second portions secured to one another by an attachment feature, the sleeve arranged radially between the first and second portions, wherein a cavity is provided within the sleeve, and a spacer is provided between the sleeve and the sonotrode to provide a gap, the cavity and gap in fluid communication with a first terminal end of the sonotrode.

8. The ultrasonic welder of claim 7, comprising an air source in fluid communication with the cavity via a cooling line.

9. The ultrasonic welder of claim 7, wherein a second terminal end of the sleeve includes multiple notches provided in a periphery of the second terminal end.

10. The ultrasonic welder of claim 7, wherein the spacer is provided on an interior surface of the sleeve, the spacer provided by multiple protrusions engaging at least one of a base and a shaft of the sonotrode.

11. The ultrasonic welder of claim 1, wherein the quick connect attachment feature includes radially extending pins on one of the first and second portions, and locking apertures on the other of the first and second portions, the pins and the locking apertures are configured to selectively cooperate with one another for replacing the sleeve captured between the first and second portions.

12. The ultrasonic welder of claim 11, wherein the stop is provided by a second flange of the second portion, and a first flange of the sleeve abuts the second flange in the extended position, the first and second flanges spaced apart from one another in the clamping position, and the spring arranged between and engaging the second flange and the first portion.

13. The ultrasonic welder of claim 11, wherein the first portion includes a hole with an air fitting.

\* \* \* \* \*